(12) United States Patent
Hammon et al.

(10) Patent No.: US 11,201,729 B2
(45) Date of Patent: Dec. 14, 2021

(54) DEVICES AND METHODS FOR ENABLING PORTABLE SECURE COMMUNICATION USING RANDOM CIPHER PAD CRYPTOGRAPHY BY ENABLING COMMUNICATIONS TO BE PASSED TO THE DEVICE FROM A HOST, ENCRYPTED AND/OR DECRYPTED, AND PASSED BACK TO THE HOST

(71) Applicant: 7Tunnels, Inc., Park City, UT (US)

(72) Inventors: Michael L. Hammon, Ames, IA (US); Wesley A. Hildebrandt, Sussex, WI (US); Kevin R. McCarthy, Park City, UT (US)

(73) Assignee: 7Tunnels Inc., Park City, UT (US)

( * ) Notice: Subject to any disclaimer, the term of this patent is extended or adjusted under 35 U.S.C. 154(b) by 289 days.

(21) Appl. No.: 16/323,390

(22) PCT Filed: Aug. 11, 2017

(86) PCT No.: PCT/US2017/046516
§ 371 (c)(1),
(2) Date: Feb. 5, 2019

(87) PCT Pub. No.: WO2018/031895
PCT Pub. Date: Feb. 15, 2018

(65) Prior Publication Data
US 2020/0336301 A1 Oct. 22, 2020

Related U.S. Application Data

(60) Provisional application No. 62/374,314, filed on Aug. 12, 2016.

(51) Int. Cl.
*H04L 9/06* (2006.01)
*G06F 7/58* (2006.01)
(Continued)

(52) U.S. Cl.
CPC ............ *H04L 9/0656* (2013.01); *G06F 7/588* (2013.01); *H04L 9/0877* (2013.01); *H04L 9/3226* (2013.01)

(58) Field of Classification Search
CPC ... H04L 9/0656; H04L 9/0877; H04L 9/3226; G06F 7/588
(Continued)

(56) References Cited

U.S. PATENT DOCUMENTS

| 5,513,261 A | 4/1996 | Maher | |
|---|---|---|---|
| 6,363,152 B1 * | 3/2002 | Cornelius | ............ H04L 9/0656 380/255 |

(Continued)

FOREIGN PATENT DOCUMENTS

| WO | 2017/011046 A2 | 1/2017 |
|---|---|---|
| WO | 2018/031895 A1 | 2/2018 |

OTHER PUBLICATIONS

Written Opinion from International Application No. PCT/US2017/046516 dated Nov. 6, 2017, 8 pages.
(Continued)

*Primary Examiner* — Bryan F Wright
(74) *Attorney, Agent, or Firm* — Phillips Winchester

(57) ABSTRACT

A cryptographic system includes a host device and a cryptographic device. For encryption, the host includes an application that is configured to enable a user to compose an unencrypted message on a user interface and transmit the unencrypted message. The cryptographic device is configured to receive the unencrypted message, encrypt the unencrypted message with RCPs on a non-volatile storage to create an encrypted message, and send the encrypted message to the host, which then transmits the encrypted message through a communication channel. For decryption, the host receives an encrypted message through the communication
(Continued)

channel and sends it to the cryptographic device. The cryptographic device decrypts the encrypted message with the RCPs and sends the decrypted message back to the host, which presents the decrypted message on a display. The cryptographic device may be configured to destroy RCPs that have been used up.

23 Claims, 7 Drawing Sheets

(51) Int. Cl.
  *H04L 9/08*     (2006.01)
  *H04L 9/32*     (2006.01)

(58) Field of Classification Search
  USPC .......................................................... 380/44
  See application file for complete search history.

(56) References Cited

U.S. PATENT DOCUMENTS

| | | | |
|---|---|---|---|
| 10,348,704 B2* | 7/2019 | Figueira | H04L 63/061 |
| 2002/0162021 A1 | 10/2002 | Audebert et al. | |
| 2005/0074118 A1 | 4/2005 | Wilhite et al. | |
| 2007/0061570 A1 | 3/2007 | Holtzman et al. | |
| 2008/0098038 A1 | 4/2008 | Motoyama | |
| 2010/0211787 A1* | 8/2010 | Bukshpun | H04L 9/065 |
| | | | 713/170 |
| 2013/0315395 A1 | 11/2013 | Jacobs | |
| 2014/0025964 A1 | 1/2014 | Hui et al. | |
| 2015/0193207 A1 | 7/2015 | Pooser | |
| 2015/0244520 A1 | 8/2015 | Kariman et al. | |
| 2016/0154745 A1* | 6/2016 | Nagai | G06F 3/0623 |
| | | | 713/176 |

OTHER PUBLICATIONS

International Search Report from International Application No. PCT/US2017/046516 dated Nov. 6, 2017, 2 pages, pages.

European Patent Office, European Search Report and Opinion, IA 17840345.7 National Phase Application of PCT/US2017/046516, dated Feb. 27, 2020, pp. 7.

* cited by examiner

DEVICES AND METHODS FOR ENABLING PORTABLE SECURE COMMUNICATION USING RANDOM CIPHER PAD CRYPTOGRAPHY BY ENABLING COMMUNICATIONS TO BE PASSED TO THE DEVICE FROM A HOST, ENCRYPTED AND/OR DECRYPTED, AND PASSED BACK TO THE HOST

CROSS-REFERENCE TO RELATED APPLICATIONS

This application is a national phase entry under 35 U.S.C. § 371 of International Patent Application PCT/US2017/046516, filed Aug. 11, 2017, designating the United States of America and published in English as International Patent Publication WO 2018/031895 A1 on Feb. 15, 2018, which claims the benefit of the filing date under Article 8 of the Patent Cooperation Treaty of U.S. Provisional Patent Application Ser. No. 62/374,314, filed Aug. 12, 2016, for "Devices and Methods for Enabling Portable Secure Communication Using Random Cipher Pad Cryptography," the disclosure of each of which is hereby incorporated herein in its entirety by this reference.

TECHNICAL FIELD

Embodiments of the present disclosure relate generally to cryptography and more specifically to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt, but can eventually be broken. Other types of encryption have significant vulnerabilities making decryption relatively easy. Conventional one-time pads are generally considered completely secure and unbreakable. However, conventional one-time pads have a drawback related to how to convey the one-time pads to keep them secret. Moreover, for conventional one-time pads, the length of the key is equal to the length of the data to be encrypted, which may be unsuitable for low-bandwidth applications even if secure conveyance of the one-time pad is possible.

DETAILED DESCRIPTION

Figure 1:
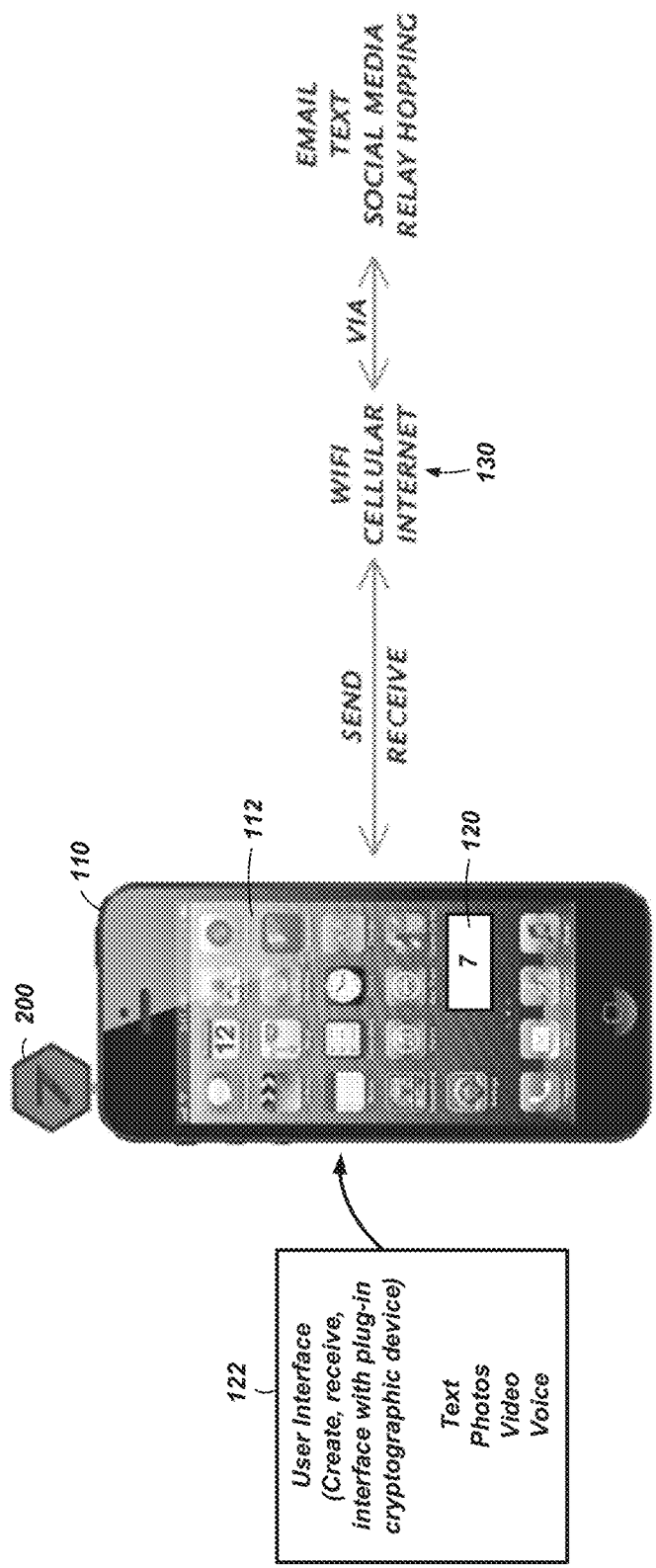
FIG. 1 is a diagram illustrating a host device and a cryptographic device (e.g., a plug-in cryptographic device) for cryptography using Random Cipher Pads (RCPs).

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings may be included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Embodiments described herein facilitate utilization of Random Cipher Pads (RCPs), which may be somewhat similar to conventional one-time pads, but used in new and different ways. The RCPs are used not only to encrypt information (for example, documents, media streams, and data files), but also to encrypt subsequent RCPs that in turn can be used by the original users recursively.

Conventional one-time pad encryption is generally recognized as being unbreakable. Similarly, RCPs include these unbreakable attributes as long as the method to use RCPs recursively is set up for the originator and recipient(s). Thus, an endless number of RCPs can be used by them, as long as the party generating the RCPs continues to send subsequent RCPs encrypted by the preceding RCPs and the used RCPs are destroyed.

Interception of the transmission generally will not help an intruder since RCP encryption cannot be broken. At worst, the intended recipient will not receive the transmission intended for him and will contact the sender, uncovering a theft or loss of information.

In some embodiments, the initial RCP exchange installation is done "outside" the electronic environment, or done in a highly secure manner with full authentication of Sender and Recipient. This results in a situation where each subsequent RCP cannot be decrypted and therefore cannot be intercepted for use.

This setup allows an enterprise, for example, an HMO that needs to send medical records to thousands of customers compliant with the Health Insurance Portability and Accountability Act (HIPPA), a way to insure that customer or participant information is not being stolen.

As another example, it also assures that transmission of information between two government agencies, for instance the Justice Department and the Treasury Department, is always secure during transmission.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use is impractical, costly, and inefficient; plus, the method of getting each successive pad into one or more recipients' hands creates vulnerabilities.

The following aspects, presented in separate or cumulative embodiments, present functionality opportunities possible with RCP encryption methods or processes. In general, an RCP may be used for data encryption and separately used for encrypting features of the encryption process itself. In other words:

1. The original RCP can be used to encrypt for electronic transmission a new, uncorrelated RCP that is also unbreakable.
2. The new uncorrelated RCP is encrypted using an RCP that came before it, meaning that the new RCP cannot be decrypted or used even if intercepted.
3. Multiple new RCPs can be generated and transmitted (along with the documents or information they encrypt or separately) by the original user(s).

Stated another way, embodiments of the present disclosure include apparatuses and methods for providing cryptographic procedures including remapping a current RCP into an uncorrelated random variable used for securely passing a replacement RCP. These embodiments are configured to reduce and/or eliminate attack surfaces. This recursive process implies that an initial RCP and mapping data may be installed in conjunction with original software installation as part of an end-point registration process. The initial RCP and mapping data may be configured such that they include matching data on a server or other device. In order to insure the integrity of the system an initial install including the initial RCP should be completed using high security protocols.

Before describing specific embodiments, and in order to facilitate description in the present disclosure, various terms are described herein. Where ambiguity may exist between the plain meaning, dictionary meaning, and the term as described herein, a person of ordinary skill in the art will recognize the term as described herein will best conform to a more comprehensive understanding of embodiments of the present disclosure.

A "True Random Number Generator" (TRNG) is a hardware device, and associated software if needed, used to generate truly random numbers from an unpredictable quantum or non-quantum physical process. Quantum examples of these processes include quantum random number generators that use nuclear decay, photons transmitted through a partially transparent mirror, and fluctuations in vacuum energy. Non-quantum examples include thermal noise, clock drift, and RF noise.

A "One Time Pad" (OTP) is a conventional random cipher key pair in which each key pair is used only once and then destroyed. One key of the pair is used to encrypt a message and the other key of the pair is used to decrypt the encrypted message. Commonly OTPs are a method of symmetric encryption and the keys are identical.

A "Random Cipher Pad" (RCP) is a different form of an OTP according to embodiments of the present disclosure. The term RCP may be used as a generic term for various species of RCPs. An RCP is a collection of truly random numbers, e.g., gathered from one or more TRNGs. The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. Each RCP within an RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID. Moreover, while a simple sequential identifier may be used to identify each RCP within an RCP pool, a GUID, a hash of the RCP, or other type of unique identifier may be used instead to identify each RCP within an RCP pool.

A "Data RCP" is a species of RCP used to encrypt and decrypt communications between two or more endpoints. Each Data RCP is only used once.

A "Random Cypher Key" (RCK) is a data RCP, a portion of a Data RCP, a combination of two or more data RCPs, or a combination of portions of two or more Data RCPs such that the RCK has a length corresponding to a length of a message that is to be operated on by the RCK.

A "Key RCP" is a species of an RCP used to encrypt and decrypt a Data RCP to securely transfer it electronically. Each Key RCP is only used once.

"Mapping" is a process of converting a Data RCP, once used, into a Key RCP for secure transfer of a subsequent Data RCP.

A "mapping index" is a list of numbers that includes the integers from one through the number of units (e.g., bytes, words, etc.) in a Data RCP in random order. The mapping index may be encrypted and sent to the appropriate endpoints of a particular communication channel and may be used as part of the process to convert Data RCPs into Key RCPs.

The terms "encrypted," "encrypted data," "encrypted data structure," and "encrypted message" refer to data that has passed through an encryption process according to embodiments of the present disclosure. As a non-limiting example, encrypted data may be generated by performing a bitwise exclusive-OR between a plain text message and an RCP.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same RCP that was used to encrypt the plain text message.

The terms "unencrypted," "unencrypted data," "unencrypted data structure," and "unencrypted message" refer to data that has never been encrypted.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to an RCP according to embodiments of the present disclosure. In contrast, a conventional one-time pad is explicitly referred to as a conventional one-time pad or a one-time pad and not simply as a pad.

Implementation Overview

This section describes an overview of certain embodiments before a detailed description of each of the figures. Embodiments of the device and method described herein allow the RCP currently in use to be re-used to encrypt and send the next RCP. Since the data in this case is purely random and the current RCP is destroyed after use, there is no opportunity to perform cryptographic analysis.

Furthermore, in some embodiments as an additional safeguard the sampling sequence while using the RCP may not be sequential. For example, one of many randomization methods might be to start using the RCP at a random pad address and then advance through the RCP using a random step size. The information about starting address and step size would be sent to the decryption device along with the data to be decrypted.

It is a characteristic of RCP encryption that if an exclusive OR operation is used to encrypt the data then applying the exclusive OR (XOR) a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

Since new RCPs are encrypted and downloaded using old RCPs, some embodiments address the origin of the first RCP that is used. In some embodiments, each pair of installations is unique and contains a relatively large seed RCP. In some embodiments, the seed RCP is never deleted and only used during product initialization and product disaster recovery. After several uses, the seed RCP may be replaced. This process would be done by using tamper evident transmission or courier delivery.

An example embodiment of a process for sending a secure document is described below. In this description, it is assumed that both parties (designated as "A" and "B") have completed installation and initialization of the product.

1. A has a document and wants to send it to B.
2. The process performs any required pre-processing and starts scanning the document and RCP byte by byte.
3. A randomly picks the randomization method and constants to be used to determine the path through the RCP.
4. Authentication, hash values, check sums, and byte counts may be pre-computed and embedded with the un-encrypted data.
5. Each byte of the document (and metadata) is ex-ORed with the corresponding RCP byte and held in a temporary location.
6. When encryption is complete, A embeds the RCP randomization method and constants with the encrypted data. This metadata may not be encrypted, but it may be obfuscated so it appears to be part of the encrypted stream.
7. A sends this encrypted data to B via standard methods (e.g., TCP/IP, FTP, and HTTP).
8. When this data is received by B, B follows the reverse procedure to recover the unencrypted data.

In some embodiments, RCP generation takes place on the computer that has the greatest resources, either on the sender's computer or on the recipient's computer. Alternatively, the RCP generation may be performed by a third-party intermediary computer or reference computer (e.g., an RCP server 410, see FIG. 4).

RCP generation may run in its own thread and take place with very little communication with the encryption/decryption (client) thread. In some embodiments, the two client threads maintain a local pool of several RCPs, which they can quickly switch to as the decision is made to retire the current RCP. When that pool drops below a specified number the RCP maintenance thread requests the RCP generator thread send another RCP pair to the two clients' RCP pools. The client maintenance thread also may maintain the RCP use count, which determines when RCPs should be retired.

The RCP generator thread may monitor its pool level causing the True Random Number Generator (TRNG) to produce new RCPs. In some embodiments, the quality of the TRNG is important. The size of RCPs may be intentionally kept as small as is realistic. Keeping the RCPs small may help to avoid unnecessary RCP latency. The faster RCPs are used and destroyed, the more secure the system is.

Although RCP sizes may vary in different implementations, or even over different stages of the same communications stream between sender and receiver devices, current prototypes have RCP sizes of 100,003 bytes (the smallest prime greater than 100,000). There may be path randomization benefits to prime sizes.

"Large" files may be defined as anything larger than the RCP size. On average, the RCP will be retired for every {RCP size} bytes of data. As a result, a 1 gigabyte file will use and retire around 10,000 RCPs, and the same file will be sent in 10,000 segments that are re-assembled at the receiving thread.

Conversely, a small file of about 1,000 bytes, with no other file activity would not replace the RCP until it was naturally retired. Therefore, the time to retain partially used RCPs during inactive periods can be specified by the user.

During decryption several factors may be monitored to guarantee message integrity (Authentication, hash values, check sums, and byte counts) when these fail the data block is refused by sending a NAK (Negative AcKnowledgement) signal to the sender. This causes the sender to reformat and resend the message. If everything is OK, the recipient sends an ACK (ACKnowledgement) signal to the sender who then formats and sends the next block.

In some embodiments, some or all of the encryption features described herein are implemented within a computer processor or processing device that executes the encryption procedures. The transformation of data that occur according to the specific encryption techniques described herein render the processing device as a special-purpose processing device capable of new functionality that is otherwise not available using conventional programming or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

Implementation Details

FIG. 1 is a diagram illustrating a host device 110 and a cryptographic device (e.g., a plug-in cryptographic device 200) for cryptography using Random Cipher Pads (RCPs). Embodiments of the present disclosure create a highly portable, very discreet, secure encryption device for use with any available smart device, tablet, phone, pad, laptop, etc., (referred to generally herein as a host device 110). All the user needs is an RCP-cryptography device 200 (also referred to herein as a plug-in cryptographic device 200) according to embodiments of the present disclosure in communication with the host device 110 (e.g., via a physical connection, for example, a plug-in connection, via wireless connection, etc.) including authorization and access to the host device 110 to send message traffic to any other host device 110 including an RCP-cryptography device 200 configured with RCPs corresponding to the sending RCP-cryptography device 200. Thus, a plug-in cryptographic device 200 enables cryptography using RCPs. Although the instant embodiment focuses on a plug-in cryptographic device, as noted above, in other embodiments, other types of connections may be utilized.

The user connects the cryptographic device 200 to any host device 110 through a communication port and opens a RCP-enabled application 120 on the host device 110 with a secure authorization code. The communication port may be any suitable communication channel, such as, for example, wireless channels like WiFi, BLUETOOTH®, and ZIG-BEE®, or plug-in ports. A user interface 122 for the RCP-enabled application 120 is then presented on a screen 112 for the user to compose a message, which may include one or more of, for example, photos, videos, voice, Text files, data files, and/or text messages into the RCP-enabled application 120. After the message is compiled, the user activates an encryption function within the RCP-enabled application 120, which passes the message to the plug-in cryptographic device 200. The plug-in cryptographic device 200 encrypts the message using a RCP library stored on the plug-in cryptographic device 200. The encrypted message is then sent back to the RCP-enabled application 120 on the host device 110 for subsequent forwarding. For example, the encrypted message may be passed back to the original source of the message (e.g., copied-all and pasted over the original content) on the host device 110, overwriting the original unencrypted content. In other embodiments, the plug-in cryptographic device 200 may forward the encrypted message itself.

When the encryption is complete, the plug-in cryptographic device 200 executes a secure delete of the used RCP on the plug-in cryptographic device 200, rendering the message quantum proof by all except the designated recipient with the only remaining copy of an RCP capable of decrypting the encrypted message. The encrypted message may then be transmitted from the host device 110 via any suitable communication channel 130 or even posted to social media, and/or hopping through many relay nodes to a destination, obscuring the final end-point.

RCP libraries on the transmitting plug-in cryptographic device 200 and a corresponding receiving plug-in cryptographic device 200 may be replenished through a secure physical connection with a hub as well as other processes discussed below.

The plug-in cryptographic device 200 may be configured to plug into any suitable port on a host device 110, such as, for example, an audio headphone port, serial ports, parallel ports, Ethernet connections, universal serial bus (USB) connections, IEEE 1394 ("firewire") connections, lightning connections, thunderbolt connections, and High Definition Multimedia Interface (HDMI) connections and mini DisplayPort connections. Some interfaces, with asymmetric bandwidth capabilities (e.g., HDMI or mini DisplayPort) and low bandwidth (e.g., audio headphone jack) may be more suitable for encryption of low bandwidth messages such as text. High bandwidth interfaces (e.g., USB, firewire, lightning, and thunderbolt) may be more suitable for encryption for high bandwidth applications such as video, audio, and multimedia messages.

Figure 2:
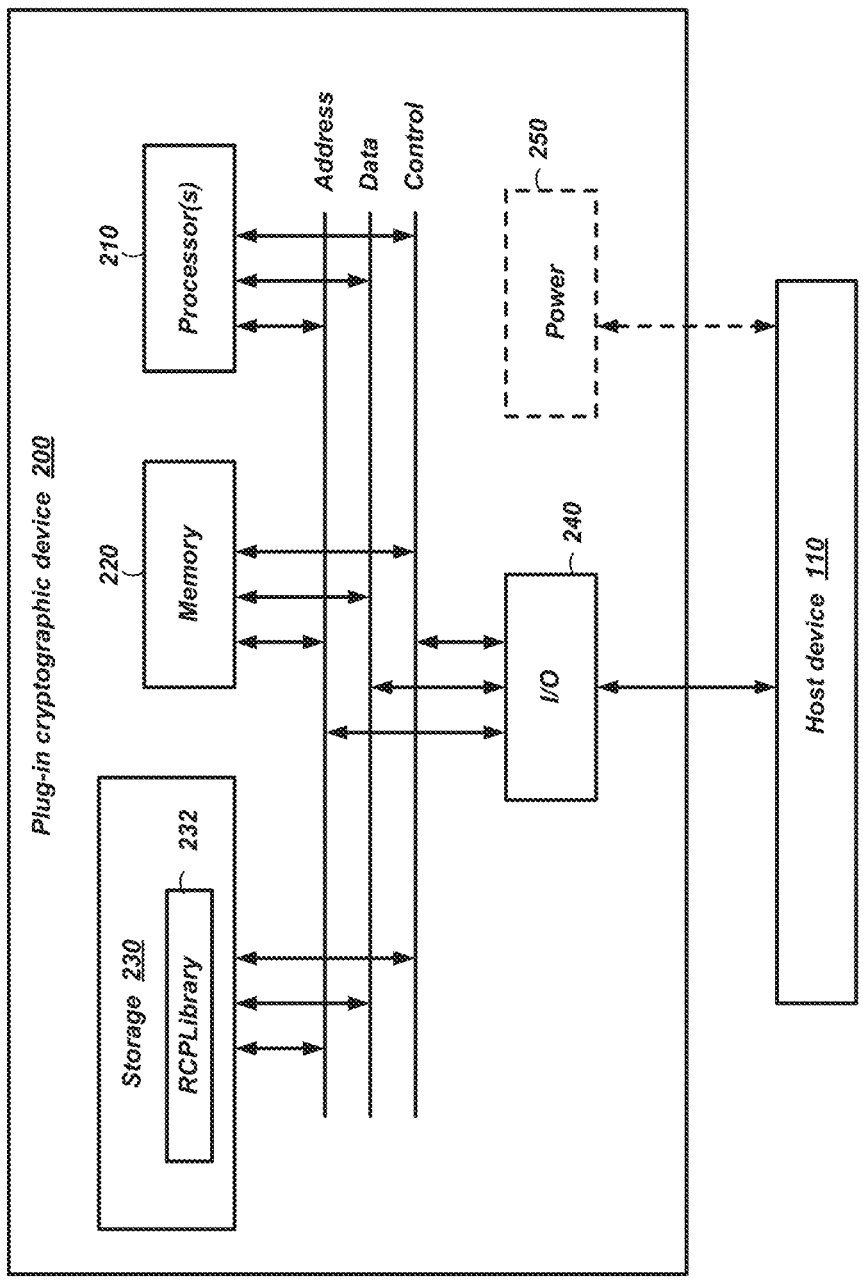
FIG. 2 is a data flow diagram of the plug-in device for cryptography using RCPs.

FIG. 2 is a structural block diagram of the plug-in device for cryptography using RCPs. The plug-in cryptographic device 200 may be configured as one or more processors 210 (e.g., a microprocessor, multiple microprocessors, microcontroller, or multiple microcontrollers). The processor 210 may be configured as an ultra-low power processor. The plug-in cryptographic device 200 also includes memory 220, non-volatile storage 230 (e.g., a Solid State Disk (SSD)), and an Input/Output (10) interface 240 to match the type of plug-in adapter. A power source 250 may be included in some embodiments and in such embodiments, a power coupling to the host device may be included to provide additional power for the plug-in cryptographic device 200 and to recharge the power source 250.

The processor(s) 210 may be generally referred to herein as processing circuitry 210 and may comprise circuitry configured as an Application Specific Integrated Circuit (ASIC) and/or Field Programmable Gate Array (FPGA) circuit. The processing circuitry 210 may communicate with other operating blocks on a common bus which may typically include Address, Data and Control buses.

A fully scaled plug-in cryptographic device 200 may be configured to feature a large non-volatile storage 230 (e.g., a 1 TB SSD) and may be configured to function at less than ½ Watt. This minimal power may initially come from the host device 110 however; ongoing research in battery technology (e.g., Metal/Air batteries) make long-life, on-board, rechargeable batteries a reasonable choice for a possible power source 250. One possibility is that batteries would be replaced or re-charged at the same time the RCPs are replaced or replenished.

The RCP library 232 may be stored in the non-volatile memory 220. The user can elect RCP replacement to be dynamic or can periodically replace or update the RCP library depending on changing users and/or servers with which the user needs to communicate.

In some embodiments, once the RCP library 232 has been at least partially depleted, the RCP library 232 can be replaced and/or updated through communication (e.g., via a physical connection, via wireless connection, etc.) with another device (e.g., a server). In some embodiments, the plug-in cryptographic device 200 may be rendered inoperable (e.g., via a memory wipe once the RCP library has been depleted to a select level) and may either be disposed of or returned to service once another RCP library 232 has been reloaded on the plug-in cryptographic device 200 (e.g., by the user, by a service provider, etc.).

In general, the host device 110 is the source/destination of all message data. The RCP-enabled application 120 on the host device 110 is used by the user to redirect data through the plug-in cryptographic device 200 to achieve encryption and decryption.

Figure 3:
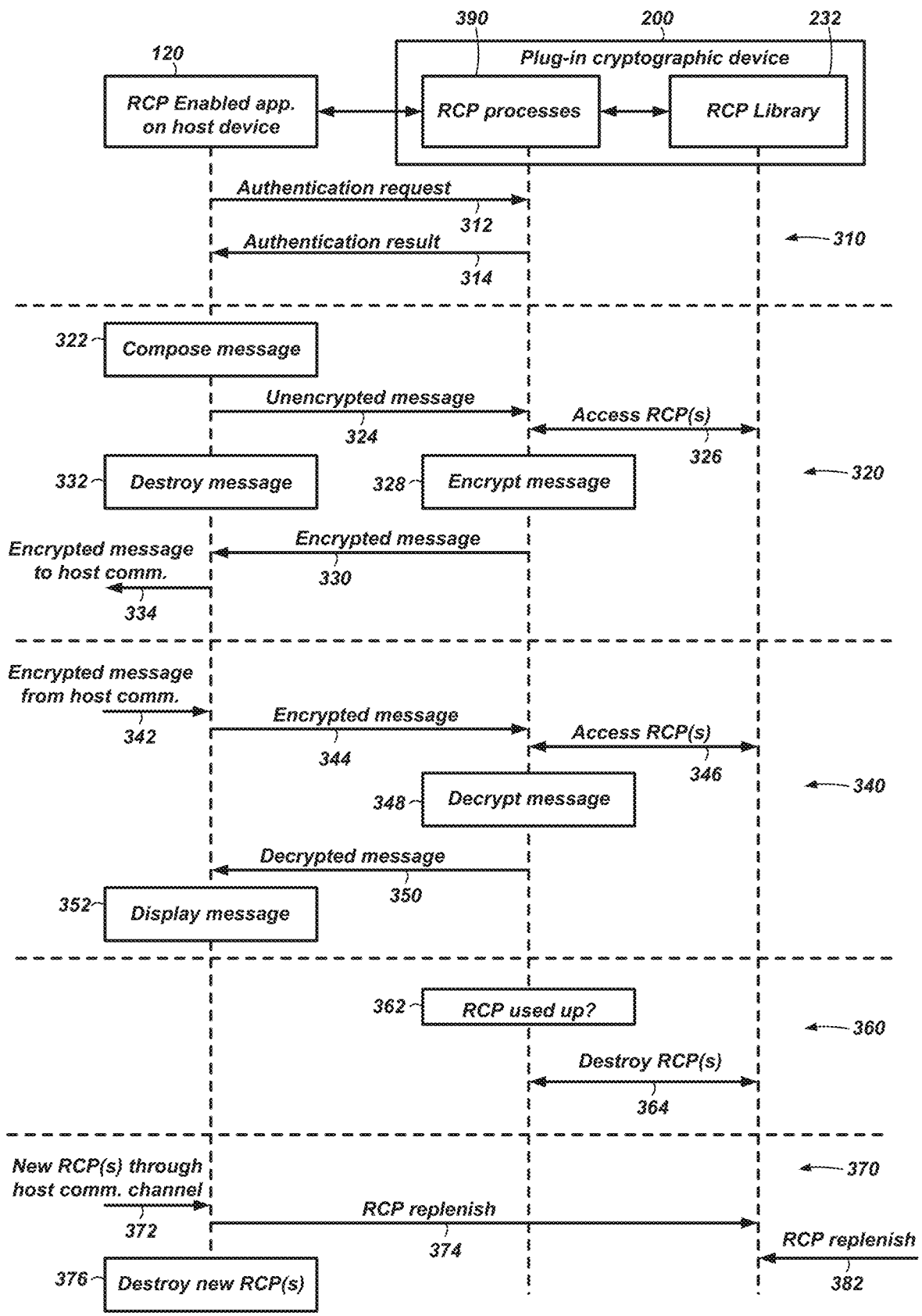
FIG. 3 is a data flow diagram illustrating some of the functions performed and data flow between the host device and the plug-in cryptographic device.

FIG. 3 is a data flow diagram illustrating some of the functions performed and data flow between the host device 110 and the plug-in cryptographic device 200. The plug-in cryptographic device 200 may be configured for multiple functions running RCP processes 390 such as, for example: holding, managing, and destroying RCP libraries; managing RCP pointers; encrypting and decrypting messages; message I/O control between the plug-in cryptographic device 200 and the host device 110; and some portions of authentication functions.

The RCP-enabled application 120 running on the host device 110 may be configured for multiple functions such as, for example, composing, displaying, and destroying messages, message I/O control between the plug-in cryptographic device 200 and the host device 110, and receiving and destroying RCP libraries after they are transferred to the plug-in cryptographic device 200.

With respect to authentication processes 310, the RCP-enabled application 120 may prompt the user for various identity parameters, passwords, and passphrases, which may be passed to the plug-in cryptographic device 200 as an authentication request 312. The correct values for these various identity parameters, passwords, and passphrases may be stored on the plug-in cryptographic device 200. These stored authentication parameters and the passed user-entered authentication parameters are compared for authentication. An authentication result 314 may be returned to the host device 110 indicating success or failure of the authentication process and enabling other cryptographic processes on the RCP-enabled application 120 if the authentication was successful.

Alternatively, the authentication process may be performed on the RCP-enabled application 120 with the stored authentication parameters on the plug-in cryptographic device 200 sent to the RCP-enabled application 120 as the authentication result 314 responding to an authentication request 312. The RCP-enabled application 120 on the host device 110 would then perform the comparison. As another alternative, the authentication process may be performed completely on the RCP-enabled application 120 with the stored authentication parameters stored within the RCP-enabled application 120.

In some embodiments, the authentication parameters may be stored in an encrypted form on the plug-in cryptographic device 200 and decrypted for use.

An encryption process 320 may begin with the user creating a message with a compose message process 322 on the RCP-enabled application 120. The unencrypted message 324 is sent to the plug-in cryptographic device 200, which accesses 326 the appropriate RCPs from the RCP library 232 for use in a message encryption process 328. The RCPs used, and the encryption process 328, are explained more fully below, among other places, with respect to FIGS. 4-6. The encrypted message (may also be referred to herein as an encrypted transmit message) is sent 330 back to the RCP-enabled application 120, which then forwards 334 the encrypted transmit message on to appropriate host communication processes on the host device 110 for transmission to another host device 110.

A decryption process 340 may begin with the host device 110 receiving an encrypted message from another host device (not shown). The host device 110 would forward 342 the encrypted receive message to the RCP-enabled application 120 running on the host device 110. The RCP-enabled application 120 would forward 344 the encrypted receive message to a decrypt process 348 running on the plug-in cryptographic device 200. The decryption process accesses 346 the appropriate RCPs from the RCP library 232. The RCPs used, and the encryption process 328, are explained more fully below, among other places, with respect to FIGS. 4-6. The decrypted receive message is sent 350 back to the RCP-enabled application 120, which then displays 352 the message on the host device 110 for the user.

A destroy process 360 on the plug-in cryptographic device 200 may be used to obliterate RCPs in the RCP library 232. A RCP monitor process 362 may determine when RCPs have been used or are no longer wanted and destroy 364 the appropriate RCP(s) in the RCP library 232. The destroy function may be configured as a multiple overwrite process suitable for non-volatile memory, such as, for example, a NSA wipe of about seven overwrites with various data patterns that are different from the data pattern being destroyed.

RCP replenish processes 370 may also be included. In some embodiments, the plug-in cryptographic device 200 may be coupled with a different computer configured for supplying 382 a new RCP library or supplementing the existing RCP library 232. As one example, this computer may be controlled by an entity that supplies suitable true random number RCPs. As another example, this computer may communicate with the entity that supplies suitable true random numbers and then load then onto the plug-in cryptographic device 200 after receipt.

In other embodiments of the replenish process 370 the new RCP(s) may come through the communication channel of the host device 110 and passed 372 to the RCP-enabled application 120. The RCP-enabled application 120 would pass the new RCP(s) to the RCP library 232 in an internal RCP replenish process 374 executed by the plug-in cryptographic device 200.

Destroy functions similar to the one on the plug-in cryptographic device 200 may be included on the RCP-enabled application 120 running on the host device 110. The destroy functions may be configured as multiple overwrite processes suitable for non-volatile memory and/or magnetic storage disks, such as, for example, a NSA wipe of about seven overwrites with various data patterns that are different from the data pattern being destroyed.

For example, new RCP(s) received through the host device 110 may be destroyed at destroy process 376. In addition, messages may be destroyed after used. For example, the destroy message process 332 may be used to destroy the unencrypted message 324 on the host device 110 after it is sent to the plug-in cryptographic device 200. Similarly, destroy functions may be included in the RCP-enabled application 120 to overwrite encrypted messages on the host device (not shown). Also, unencrypted messages and decrypted messages on the plug-in cryptographic device 200 may be destroyed (not shown) after use.

For some embodiments, the RCP-enabled application 120 may be loaded onto the host device 110 from the plug-in cryptographic device 200 to enable use of any accessible host device 110.

Figure 4:
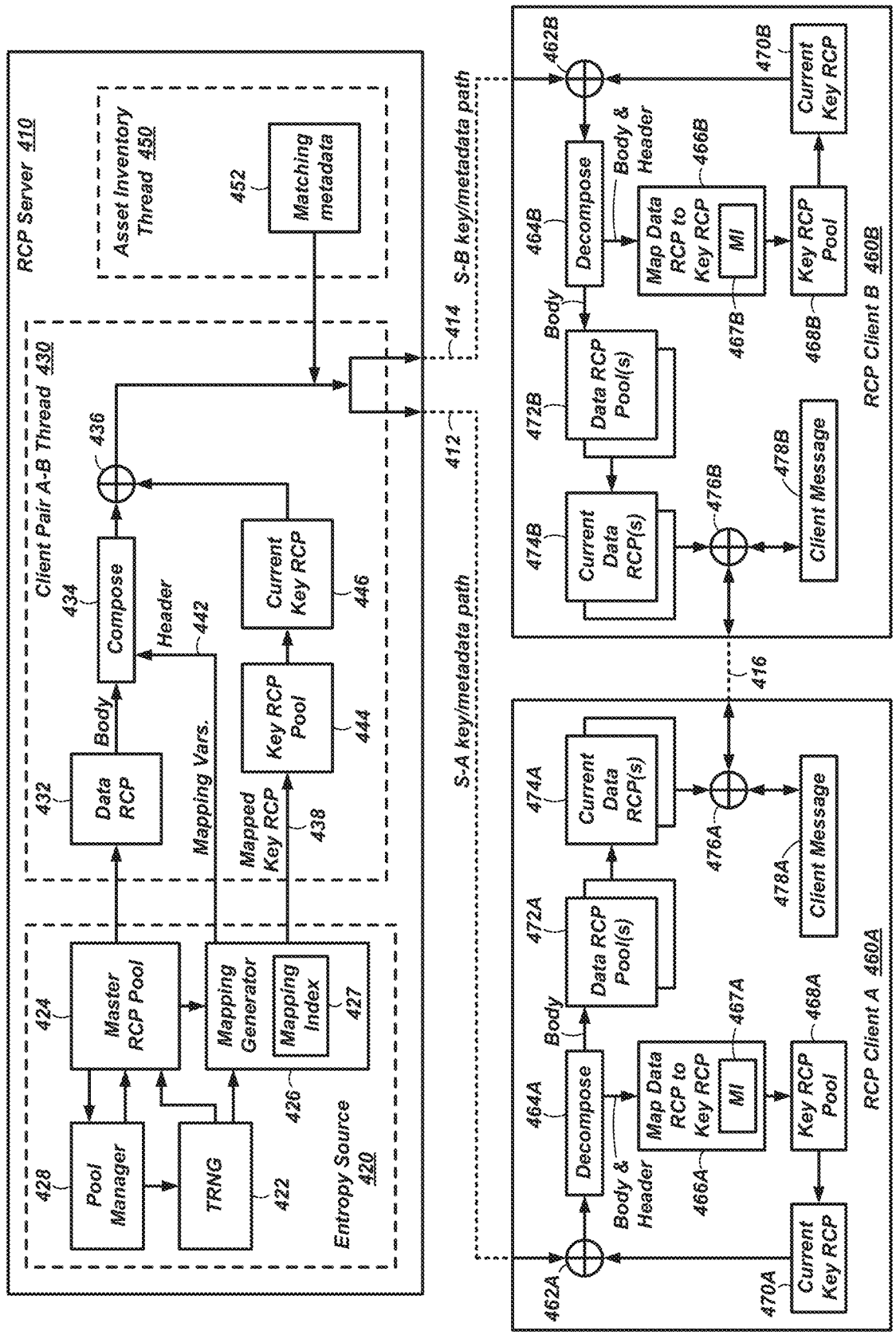
FIG. 4 is a block diagram illustrating a system including a RCP server and RCP clients for message encryption.

FIG. 4 is a block diagram illustrating a system including an RCP server 410, and two RCP clients (460A and 460B) for message encryption. FIG. 4 is used as one example of how an RCP server and RCP clients may interact to give additional details. Other variations of RCP servers, TRNG hardware devices, and RCP client, and the interactions therebetween may be used in various embodiments of the present disclosure.

The RCP server 410 may include various processes, which may run in separate threads on the RCP server 410. An entropy source 420 may be used to generate random numbers and manage a master RCP pool 424. One or more RCP client pair threads 430 (e.g., RCP client pair A-B thread 430 is shown in FIG. 4) may be used to generate Key RCPs and Data RCPs. One or more asset inventory threads 450 may be included to manage the RCPs for the various RCP client pairs and manage matching metadata 452 for the various RCP client pairs.

For ease of description, FIG. 4 is a simplified depiction of an overall system. A person of ordinary skill in the art will recognize that there may be many RCP clients in a system according to the present disclosure. Moreover, many different RCP clients may wish to communicate. In systems of the present disclosure, communication occurs between a pairing of RCP clients as well as pairing between the RCP server 410 and each RCP client 460. For example, perhaps there are four RCP clients; client A, client B, client C, and client D. In such a system, the RCP server 410 may need to manage Data RCPs and Key RCPs for a variety of client pairs. For brevity, only the A-B pairing between RCP client A 460A and RCP client B 460B is discussed herein. However, as a non-limiting example, there may be other client pairing such as A-C, A-D, B—C, B-D, and C-D. All of these various pairing would be managed by the RCP server 410 and each separate pairing may have its own RCP client pair thread running on the RCP server 410.

In the example of FIG. 4, the RCP server 410 conveys RCPs and RCP metadata 452 on an S-A key/metadata path 412 between the RCP server 410 and RCP client A 460A. Similarly, the RCP server 410 conveys RCPs and RCP metadata on an S-B key/metadata path 414 between the RCP server 410 and RCP client B 460B. RCP client A 460A and RCP client B 460B send encrypted data back and forth across a communication path 416. The communication paths (412, 414, and 416) may use any suitable communication interfaces and protocols, such as, for example, BLUETOOTH® wireless signals, 802.1 a/b/g/n type wireless signals, cellular phone signals, TCP/IP, FTP, and HTTP.

The entropy source 420 includes the master RCP pool 424 that holds a collection of generic RCPs for use by the various RCP client pair threads to build and transmit Key RCPs 438 and Data RCPs 432 to the RCP client pair (460A, 460B). A pool manager 428 manages pool requests from the master RCP pool 424 to keep the master RCP pool 424 relatively full. For example, if the master RCP pool 424 falls below a predetermined threshold of available RCPs, the master RCP pool 424 may send a request for additional RCPs to the pool manager 428. In some embodiments, request may come from other sources, such as, for example, a Key RCP pool 444 in the client pair A-B thread 430, the RCP client pair (460A, 460B) it they are running low on Data RCPs or Key RCPs, or the asset inventory thread 450.

A True Random Number Generator (TRNG) 422 is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise. The TRNG 422 delivers random numbers to the master RCP pool 424 to populate RCPs with random numbers. The TRNG 422 may also deliver random numbers to a mapping generator 426 for building a mapping index 427, as explained more fully below.

Turning to the client pair A-B thread 430 (and any other client pair threads not shown), the master RCP pool 424 delivers an RCP to a Data RCP 432. The master RCP pool 424 also delivers the same RCP to the mapping generator 426 where the RCP is mapped into a Key RCP. A mapped Key RCP 438 is delivered to the Key RCP pool 444. In addition, a unique Key RCP identifier 442 used to define which Key RCP from the Key RCP pool 444 is to be used is sent to a compose module 434. The compose module 434 takes the Data RCP 432 as a message body and adds the unique Key RCP identifier 442 as a header. Details of this process are explained more fully below.

An encryption process 436 encrypts the composed Data RCP 432 using a current Key RCP 446 from the Key RCP pool 444. The encryption process 436 is illustrated in FIG. 4 as a simple bitwise XOR. However, other embodiments may include any suitable symmetric encryption process. After encryption, the resulting RCP is transmitted to both RCP client A 460A and RCP client B 460B.

RCP client A 460A and RCP client B 460B operate in a substantially similar manner and include the same elements. As a result, description of the RCP clients 460 will refer to the generic elements without the designator "A" or "B" except where needed. The RCP cipher is received at a decryption process 462. The decryption process 462 uses a current Key RCP 470 to decrypt the RCP and send it to a decompose module 464. The decompose module 464 separates the body portion and sends it to one or more Data RCP pools 472. In some embodiments, separate pools are maintained for send data and receive data. For the RCP clients 460 to properly encrypt and decrypt messages, the RCP clients 460 stay in synchronization. Moreover, some RCP clients 460 may be able to communicate full duplex sending and receiving encrypted messages simultaneously. Thus, to facilitate this complex traffic, each RCP client 460 may maintain a send Data RCP pool 472 and a receive Data RCP pool 472. In such embodiments, the Data RCPs in the send Data RCP pool 472 on one RCP client 460 would match up with the Data RCPs in the receive Data RCP pool 472 and vice versa. Coherence of these various RCPs and RCP pools between the RCP clients 460 may be managed by the asset inventory thread 450 and matching metadata 452 that is sent to the various RCP clients 460.

The decompose module 464 also sends the decrypted RCP (both the body and the header) to a mapping module 466. The mapping module 466 performs a process similar to that used by the mapping generator 426 in the RCP server 410 to convert the Data RCP to a Key RCP. This process is determined by variables in the header and is explained more fully below. The resulting Key RCP is sent to the Key RCP pool 468 for future use. The mapping module 466 may also send the body to one of the data RCP pools 472. The mapping module 466 may also use the decrypted RCP from the decompose module 464 to generate a new mapping index 467 to replace the current mapping index 467 or modify the current mapping index 467.

For secure communication between the RCP clients 460, a current Data RCP 474 is drawn from the appropriate Data RCP pool 472. For example, client A 460A uses a current send Data RCP 474A and an encryption process 476A to encrypt a client message 478A. The encrypted message is sent to client B. Client B uses a current receive Data RCP 474B and a decryption process 476B to generate a decrypted client message 478B. As discussed earlier, in this example the encryption process 476A and decryption process 476B are illustrated as a simple bitwise-XOR and, as a result, can be the same process on both clients. In embodiments using a different type of symmetric encryption, the encryption process and decryption process may be different.

In the reverse direction, client B 460B uses a current send Data RCP 474B and an encryption process 476B to encrypt a client message 478B. The encrypted message is sent to client A. Client A uses a current receive Data RCP 474A and a decryption process 476A to generate a decrypted client message 478A. In both directions, a Data RCP is only used once and is destroyed after use.

System Interaction

Now, a more full system interaction discussion will add additional details concerning RCP management and communications between the RCP server 410 and the RCP client pair (460A, 460B). The concept is to provide the clients 460 with matching Data RCPs that they can freely dip into to do standard symmetrical encryption. As stated earlier, in order to avoid certain collision issues, some embodiments may maintain separate Data RCPs for sending and receiving data. The Sending Data RCP of one client pairs with the Receiving Data RCP of the other client.

Metadata may be exchanged between the RCP server 410 and each of the clients 460 independent of the client pairing. This metadata exchange may require additional RCP Pools even before a pairing is established. The use of this link is quite limited, but may be needed in some embodiments. For example, if there were no communications prior to the client pairing, the clients would not know how to request a client pairing.

The following will discuss bootstrapping into a client pairing, then to a client pair startup, then to client communications.

At client installation, each client 460 is loaded with sufficient RCP data to establish a pairing with the RCP server 410, requiring no unencrypted communication. No predefined Mapping Parameters are required. This means the current Key RCP 470 should be loaded and the Key RCP Pool 468 should contain one item. The extra RCP is because the RCP server 410 will be sending RCPs with headers, which is larger than just the RCP. The output of the Data RCP decryption process 462 can be redirected to any RCP Pool (receive 472, send 472, key 468) or the mapping index 467 using metadata in the header.

Server Startup & Initialization

The entropy source 420 is started to begin populating the master RCP pool 424. This thread uses the TRNG 422 to generate random numbers for each element of each RCP and starts building the master RCP pool 424. The pool manager 428 monitors the master RCP pool 424 to throttle creation of RCPs when the master RCP pool 424 is near full.

User Logon

A listener thread (not shown) is started on the RCP server 410 to monitor various clients 460 for individual user logins. A user thread (not shown) on the RCP server 410 is started, which handles communications between the individual users on the clients 460 and the RCP server 410. The RCP server 410 sends a new RCP directed to a Key RCP pool 468 for a server/client link. The RCP server 410 loops, creating new Key RCPs until the desired level of Key RCPs in the Key RCP pool 468 for the server/client link (412, 414) is achieved. This link is used for all communications pre-pairing as well as any communication associated with the individual client, as opposed to the pair.

Note that this server/client link is a thread that is not shown in FIG. 4. It is similar to the client pair A-B thread 430, but used to maintain a pairing for RCP management and secure communication between the RCP server 410 and an individual client 460.

User Request for Pairing

A client 460 may request pairing with any other logged in client 460. From the request, the RCP server 410 starts the client pair A-B thread 430. In addition, under direction from the RCP server 410, each client 460 starts its user pair thread for this specific client pairing. While not shown in FIG. 4, a client 460 may be communicating with multiple other clients 460 and would maintain a client pair thread for each client 460 it is communicating with.

The RCP server 410 sends a new RCP directed to the Key RCP pool (468A, 468B) on both clients (460A, 460B). Metadata in the header of the RCP includes randomly selected mapping parameters directed to seed the Data RCP pools (472A, 472B). This process is repeated until a desired level of RCPs in the Key RCP pools (468A, 468B) is reached.

The RCP server 410 sends a new RCP directed to a Data RCP Pool (472A, 472B) for both clients, metadata in the new RCP includes randomly selected mapping parameters directed to seed the Data RCP Pools (472A, 472B). This process is repeated until a desired level of RCPs in the Data RCP pools (472A, 472B) is reached.

The RCP server 410 starts the asset inventory thread 450, which uses metadata to force the client RCP Pools (key 468, send 472, and receive 472) and mapping parameter buffers (not shown) to match. The clients 460 initialize the user pair communications link 416 using any suitable communication interface and protocol.

Mapping parameters are stored in a buffer associated with each Data RCP Pool 472 under the direction of the RCP server 410. New parameters come with each Data RCP received but are not necessarily associated with that pool. The target is decided by the asset inventory thread 450. The parameters may be chosen in a First-In-First-Out (FIFO) manner. If certain errors are encountered the mapping parameters could conceivably run low in which case the asset inventory thread 450 may direct the priority be given to replenishment. The same general comment applies to Key RCP Pools 468 as well. There is a great deal of asymmetry of bandwidth in this setup. Most of the bandwidth between the RCP server 410 and the client 460 is consumed in the RCP movement while all other communications are just small amounts of metadata.

User Pair Communications

Communication between clients 460 may be full duplex. (Meaning both users can send at the same time without collision, if the digital protocol allows it.) Assuming both clients 460 are in synch and client A 460A is sending a client message 478A to client B 460B, then when client A 460A has depleted the current sending Data RCP 474A it simply picks up the next sending Data RCP 474A from the sending Data RCP Pool 472A and continues until done with the current client message 478A or the sending block is full.

When client B 460B receives the block it does the same, but getting the next receiving Data RCP 474B from the receiving Data RCP Pool 472B. If any loss of synchronization occurs, it may be picked up by the GUID, or other RCP identifier, in the block header.

Mapping Data RCPs to Key RCPs

Figure 5:
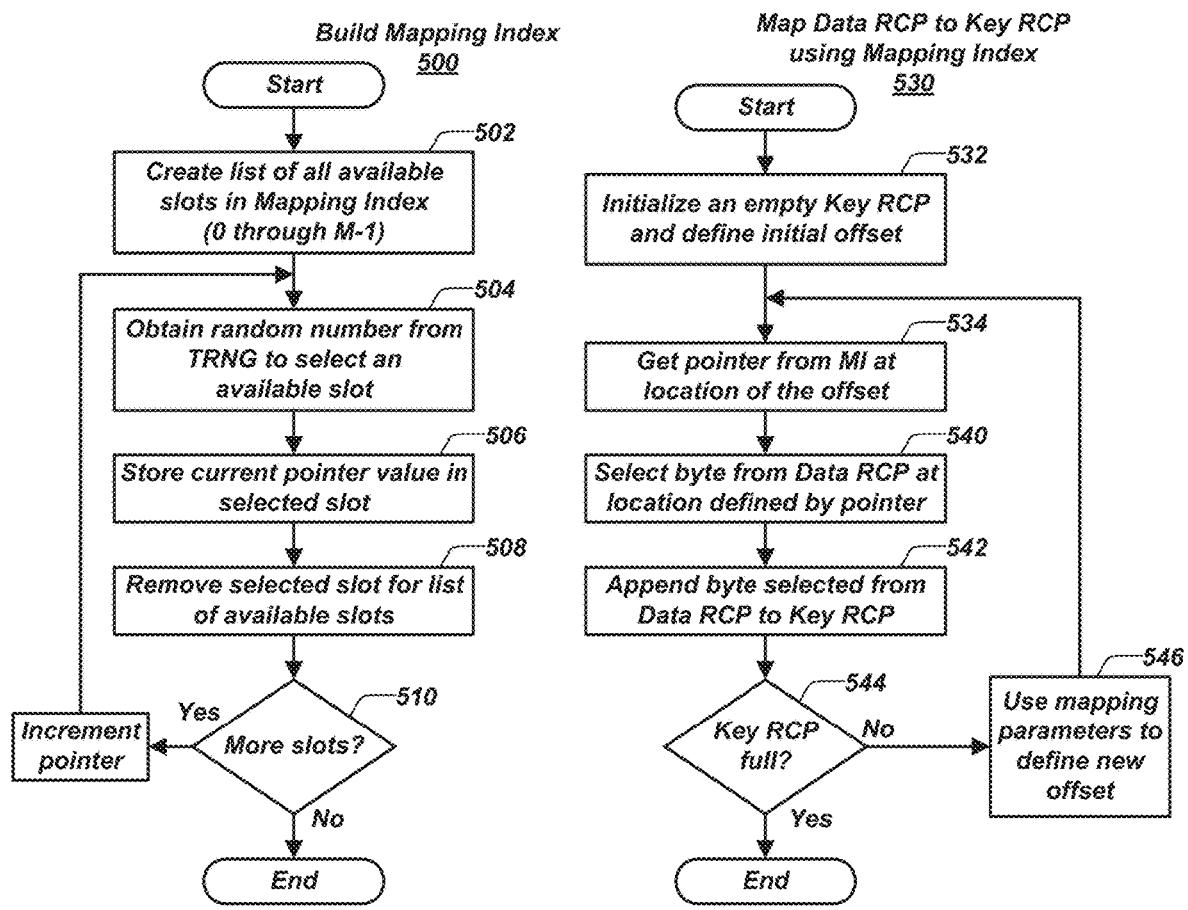
FIG. 5 illustrates processes for generating a mapping index, mapping a Data RCP to a Key RCP using the mapping index, and directly mapping a Data RCP to a Key RCP.

FIG. 5 illustrates processes for generating a mapping index, mapping a Data RCP to a Key RCP using the mapping index, and directly mapping a Data RCP to a Key RCP.

Figure 6:
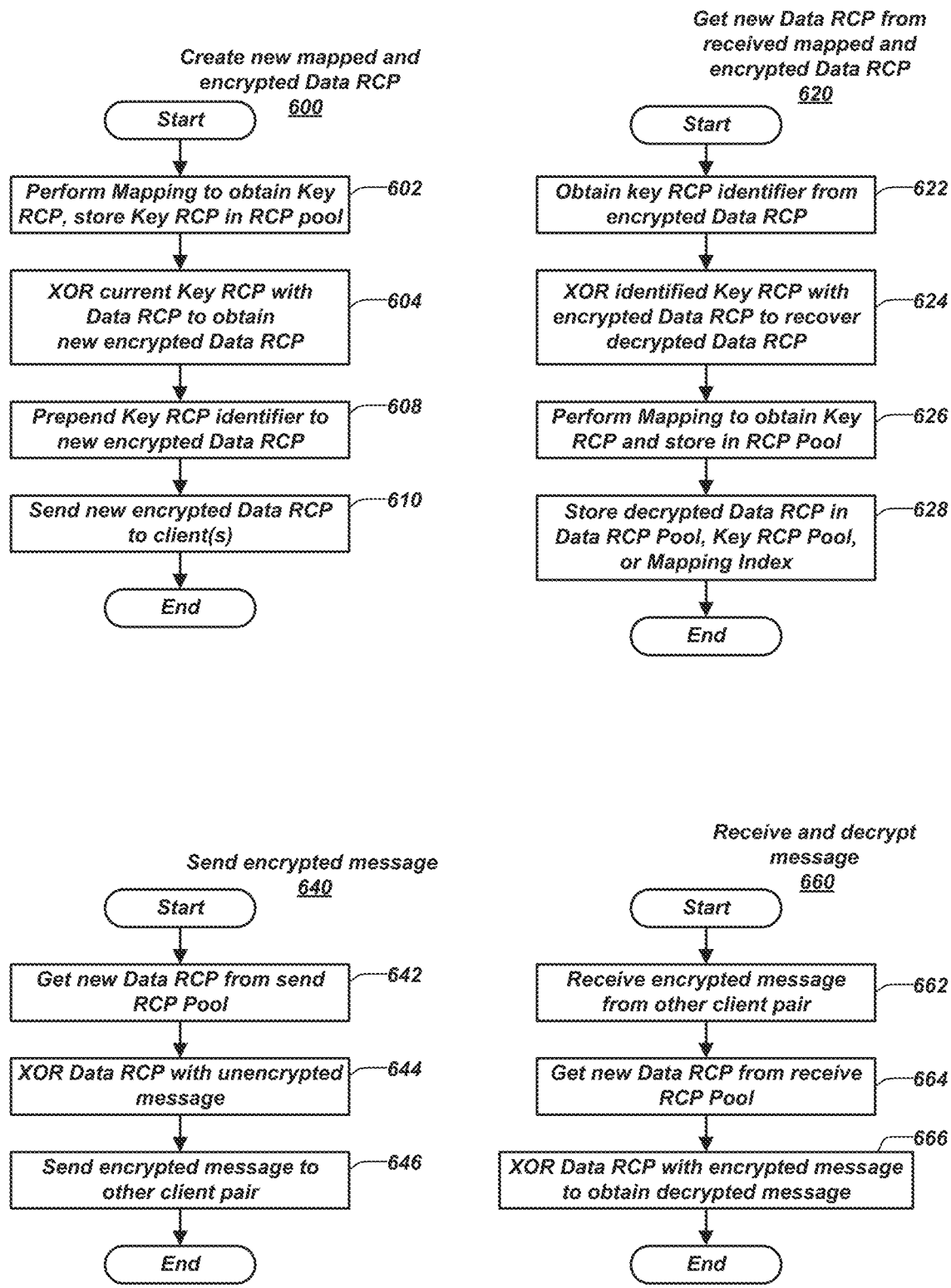
FIG. 6 illustrates processes for creating a new RCP on the RCP server, generating a new RCP from an encrypted RCP on a client, sending an encrypted message, and decrypting a received message.

FIG. 6 illustrates processes for creating a new RCP on the RCP server 410, generating a new RCP from an encrypted RCP on a client, sending an encrypted message, and decrypting a received message.

These figures will be discussed together and in combination with FIG. 4 to fully discuss example embodiments of the mapping processes. In general, the mapping processes apply a pad mapping to a Data RCP using each element of the Data RCP once in a predetermined non-sequential order to develop a Key RCP.

In general, Data RCPs have a total key size N (e.g., in bytes). The mapping index may have a size M>=N (measured in number of pointers). The mapping index should be selected to have a total index size M that is a prime number and the size of the pointers in the mapping index should be selected such that the pointers can represent any number 0 through N−1.

The mapping index can be used to adequately randomize Data RCPs into Key RCPs as long as the mapping index is replaced occasionally. If the mapping index is used many times, even with random addressing methods to select elements of the mapping index, a pattern may emerge in the correlation between the Data RCP and the Key RCP. By making the size of the mapping index prime and using one of many different random addressing methods, the pad mapping process may take different paths through the mapping index for each mapping of a Data RCP to a Key RCP.

Since mapping index replacement may be more bandwidth intensive than moving RCPs, the lifetime of a mapping index before replacement is needed may be extended by using the random addressing methods to take the different paths through the mapping index. As one non-limiting example, a random start location and random step size through the mapping index may be included with an encrypted Data RCP.

FIG. 5 includes a process 500 for building a mapping index. At process 502, a list is created for all the available slots in the mapping index. A pointer value is also initialized to 0 at process 502.

At process 504, a random number is obtained from the TRNG 422 (FIG. 4). This random number is used to select a slot in the mapping index. Thus, for this process the TRNG 422 may be configured to produce random numbers between 0 and M−1.

At process 506, the current pointer value (0 for the first time through the loop) is stored in the slot selected by the random number from the TRNG 422.

At process 508, the currently selected slot is removed from the list of available slots.

At process 510, a decision is performed to determine whether all of the slots in the mapping index have been filled. If so, the process 500 ends. If not, process 504 increments the pointer and the process 500 loops back to process 504 to populate another randomly selected slot with the current pointer value.

FIG. 5 also includes a process 530 for mapping a Data RCP to a Key RCP using the mapping index. For this mapping process, a random addressing method is defined for determining a random path through the mapping index.

As one non-limiting example, an initial location and a step size may be provided to form a process for walking through all locations of the Key RCP. Thus, a step size may be selected that is mutually prime with the size of the mapping index that is being stepped through. This can be accomplished by choosing a size for the mapping index that is prime, or by carefully choosing a step size that is mutually prime with the size of the mapping index (step sizes that are prime themselves, for example).

Many other random addressing methods for the mapping index may be defined for embodiments of the present disclosure as long as mapping parameters for performing the addressing method can be passed between the two nodes that need to follow the same path through the mapping index for any specific mapping of a Data RCP to a Key RCP.

At process 532, an empty Key RCP is initialized. Also, the mapping parameters are used to define an offset into the mapping index as the initial location to begin the process 530.

At process 534, an RCP pointer from the mapping index is selected from the location pointed to by the offset value.

At process 540 the byte from the Data RCP at the location pointed to by the RCP pointer value is selected.

At process 542, the retrieved byte is appended to the next location of the Key RCP.

At process 544, a test is performed to determine if the Key RCP is full. If so, the process ends.

If the Key RCP is not full, process 546 uses the mapping parameters to define a new offset into the mapping index. After the new offset is obtained the process 530 loops back to process 534 and repeats until the Key RCP is fully populated.

The mapping process 530, as well as other suitable mapping processes, may be used in the processes 600 and 620 described below with the description of FIG. 6. These mapping processes may also be referred to herein as pad mapping. In addition, while the Data RCP and Key RCP are described such that each location includes a single byte, other sizes, such as, for example, 16-bit words, 32-bit words, and 64-bit words may be used.

FIG. 6 illustrates processes for creating a new RCP on the RCP server 410, generating a new RCP from an encrypted RCP on a client, sending an encrypted message, and decrypting a received message.

Process 600 is a process for creating a new RCP on the RCP server. At process 602, a pad mapping according to process 530, or other suitable process for defining a path through the mapping index, is performed to obtain a Key RCP from a Data RCP, the new Key RCP may be stored in the RCP pool.

At process 604, the Data RCP is XORed with a current Key RCP retrieved from the RCP pool to obtain a new encrypted Data RCP. As stated earlier, XOR is one example of a symmetric encryption that may be used. Other embodiments may use a different type of symmetric encryption.

At process 608, a unique Key RCP identifier may be prepended to the new encrypted Data RCP. The prepending is a non-limiting example. The Key RCP identifier could be placed at other locations within the encrypted Data RCP as long as the Key RCP identifier can be used to define the same Key RCP in a Key RCP pool by both the sender and receiver.

At process 610, the encrypted Data RCP with the key RCP identifier included is sent to the RCP client pair (460A, 460B).

Process 620 is a process for generating a new RCP from an encrypted RCP on a client 460. This process 620 is performed on each client of the RCP client pair (460A, 460B).

At process 622, the encrypted Data RCP with the Key RCP identifier included is received by the client 460 and the Key RCP identifier is extracted from the encrypted Data RCP.

At process 624, the Key RCP identifier is used to select a current Key RCP and the current Key RCP is XORed with the Data RCP to obtain a new decrypted Data RCP. As stated earlier, XOR is one example of a symmetric encryption that may be used. Other embodiments may use a different type of symmetric encryption.

At process 626, a pad mapping according to process 530, or other suitable process for defining a path through the mapping index, may be performed to obtain a Key RCP from the Data RCP. The new Key RCP may be stored in the RCP pool.

At process 628, the new decrypted Data RCP is stored in one of the Data RCP pools 472 (send or receive) the Key RCP Pool 468 (when building a reserve of Key RCPs), or the mapping index 467 when directed by the asset inventory thread 450 from the RCP server 410.

Process 640 is a process for encrypting a client message and sending the encrypted message. At process 642, a Data RCP 474 is obtained from the send Data RCP Pool 472. In some embodiments that do not enable full duplex communication, there may be a single Data RCP pool 472 rather than a send Data RCP pool 472 and a receive Data RCP pool 472.

At process 644, an unencrypted client message 478 is XORed 476 with the Data RCP 474 to obtain an encrypted message. As stated earlier, XOR is one example of a symmetric encryption that may be used. Other embodiments may use a different type of symmetric encryption.

At process 646, the encrypted message is sent to the other client participating in this client pair.

Process 660 is a process for receiving an encrypted message and decrypting the message. At process 662, the encrypted message is received from the other client participating in this client pair.

At process 664, a Data RCP 474 is obtained from the receive Data RCP Pool 472. In some embodiments that do not enable full duplex communication, there may be a single Data RCP pool 472 rather than a send Data RCP pool 472 and a receive Data RCP pool 472.

At process 666, the encrypted client message is XORed 476 with the Data RCP 474 to obtain an unencrypted client message 478. As stated earlier, XOR is one example of a symmetric encryption that may be used. Other embodiments may use a different type of symmetric encryption.

Figure 7:
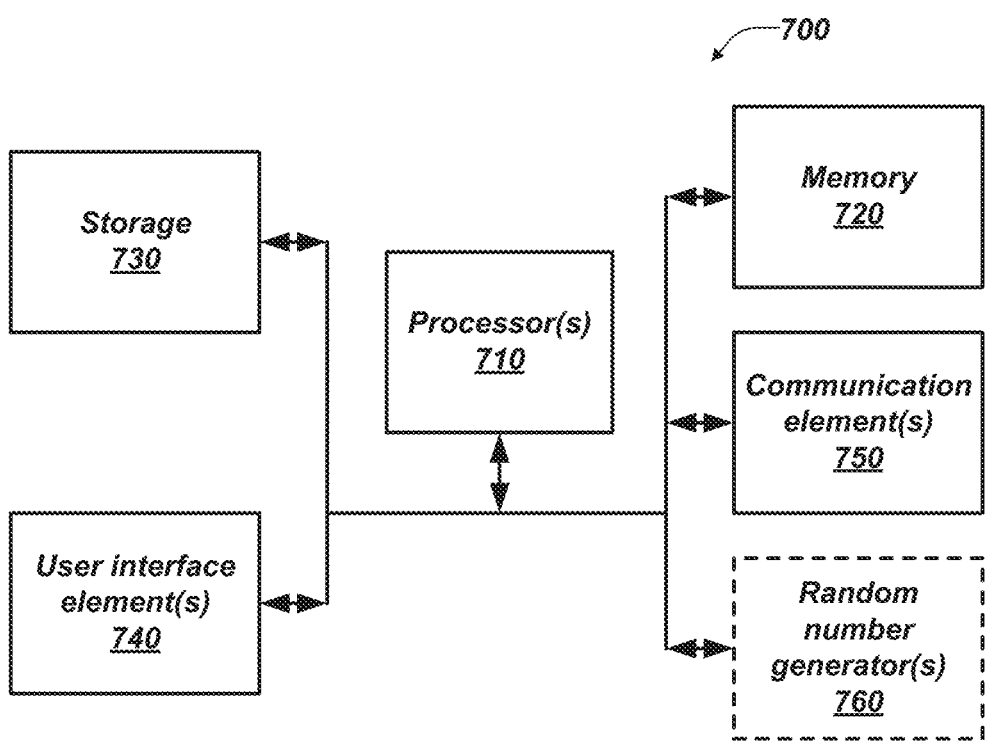
FIG. 7 is a block diagram illustrating a computing system for practicing embodiments of the present disclosure.

FIG. 7 illustrates a computing system 700 for practicing embodiments of the present disclosure. As non-limiting examples, the computing system 700 may be a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 700 is configured for executing software programs containing computing instructions and includes one or more processors 710, memory 720, storage 730, user interface elements 740, and one or more communication elements 750. Some embodiments of the computing system 700 may include one or more random number generators 760 as explained more fully above in connection with FIGS. 1-6.

The one or more processors 710 may be configured for executing a wide variety of operating systems and applications including computing instructions for carrying out embodiments of the present disclosure.

The memory 720 may be used to hold computing instructions, data structures, and other information for performing a wide variety of tasks including performing embodiments of the present disclosure. By way of example, and not limitation, the memory 720 may include Synchronous Random Access Memory (SRAM), Dynamic RAM (DRAM), Read-Only Memory (ROM), flash memory, and the like.

The memory 720 may include other types of memory devices, including volatile storage devices or non-volatile storage devices, configured to store information. Examples of other types of memory 720 include nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 730 may be used for storing relatively large amounts of non-volatile information for use in the computing system 700 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 700 may be presented to, and received from, a user with one or more user interface elements 740. As non-limiting examples, the user interface elements 740 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 750 may be configured for communicating with other devices or communication networks. As non-limiting examples, the communication elements 750 may include elements for communicating on wired and wireless communication media, such as, for example, serial ports, parallel ports, Ethernet connections, universal serial bus (USB) connections IEEE 1394 ("firewire") connections, lightning connections, thunderbolt connections, BLUETOOTH® wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 730, transferred to the memory 720 for execution, and executed by the processors 710. The processors 710, when executing computing instructions configured for performing the processes, constitute structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 730 (e.g., a computer-readable storage medium), in memory 720, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage 730 or memory 720 devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as "computer-readable media."

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A cryptographic device, comprising:
   a communication port configured for conveying data between the cryptographic device and a host device, wherein the cryptographic device is attached to the host device;
   non-volatile storage with a Random Cipher Pad (RCP) library including one or more Random Cypher Pads (RCPs) stored thereon; and
   processing circuitry configured for:
      receiving an unencrypted message from the host device through the communication port;
      encrypting the unencrypted message with the one or more RCPs to generate an encrypted transmit message;
      returning the encrypted transmit message back to the host device through the communication port to the host device, the encrypted transmit message to be sent from the host device to another device where the encrypted transmit message is decrypted; and
      destroying RCPs in the RCP library after they have been used in encrypting the unencrypted message.

2. The cryptographic device of claim 1, wherein the cryptographic device further comprises a plug-in feature configured for physically coupling with the host device, wherein the communication port is configured as a plug-in port configured for conveying data between the cryptographic device and the host device.

3. The cryptographic device of claim 1, wherein the processing circuitry is further configured for:
   receiving an encrypted receive message from the host device;
   decrypting the encrypted receive message with the one or more RCPs to generate a decrypted receive message;
   returning the decrypted receive message to the host device; and
   destroying RCPs in the RCP library after they have been used in decrypting an encrypted message.

4. The cryptographic device of claim 1, wherein the processing circuitry is further configured for:
   storing at least one stored authentication parameter stored on the non-volatile storage;
   receiving at least one user-entered authentication parameter from the host device;
   comparing the at least one user-entered authentication parameter to the at least one stored authentication parameter; and
   sending a result of the comparison to the host device.

5. The cryptographic device of claim 1, wherein the processing circuitry is further configured for:
   receiving additional RCPs through the communication port; and
   storing the additional RCPs in the RCP library.

6. The cryptographic device of claim 1, wherein the RCPs in the RCP library comprise random numbers generated from a true random number generator.

7. The cryptographic device of claim 1, wherein the RCPs in the RCP library comprise random numbers generated from a quantum random number generator.

8. A system, comprising:
   a host device configured with memory having a Random Cipher Pad (RCP)-enabled application loaded thereon, the RCP-enabled application configured to:
      enable a user to compose an unencrypted message on a user interface;
      transmit the unencrypted message through a communication port;
      receive an encrypted transmit message through the communication port; and
      transmit the encrypted transmit message from the host device to another device; and
   a cryptographic device comprising:
      an interface to operably couple with the host device at the communication port; and
      memory having instructions configured to:
         receive the unencrypted message from the host device through the communication port;
         encrypt the unencrypted message with one or more RCPs from an RCP library on a non-volatile storage to create the encrypted transmit message;
         return the encrypted transmit message to the host device through the communication port; and
         destroy used RCPs in the RCP library.

9. The system of claim 8, wherein the cryptographic device comprises a plug in interface configured for physically coupling with the host device and the communication port is configured as a plug-in port configured for conveying data between the cryptographic device and the host device.

10. The system of claim 8, wherein:
the RCP-enabled application of the host device is further configured to:
  send an encrypted receive message through the communication port;
  receive a decrypted receive message from the cryptographic device; and
  present the decrypted receive message on a display of the host device; and
the memory having instructions of the cryptographic device is further configured to:
  receive the encrypted receive message through the communication port;
  decrypt the encrypted receive message with the one or more RCPs to generate the decrypted receive message; and
  send the decrypted receive message to the host device.

11. The system of claim 8, wherein:
the RCP-enabled application of the host device is further configured to:
  enable the user to enter at least one user-entered authentication parameter on the user interface; and
  send the at least one user-entered authentication parameter to the cryptographic device; and
the memory having instructions of the cryptographic device is further configured to:
  store at least one stored authentication parameter on the non-volatile storage;
  receive the at least one user-entered authentication parameter from the host device;
  compare the at least one user-entered authentication parameter to the at least one stored authentication parameter; and
  send a result of the comparison to the host device.

12. The system of claim 8, wherein the RCP-enabled application of the host device is further configured to destroy the unencrypted message on the host device by overwriting the unencrypted message with the encrypted transmit message, overwriting the unencrypted message multiple times with data patterns different from the unencrypted message, or a combination thereof.

13. The system of claim 8, wherein the memory having instructions of the cryptographic device is further configured to:
  receive additional RCPs through the communication port; and
  store the additional RCPs in the RCP library.

14. The system of claim 13, wherein the RCP-enabled application of the host device is further configured to:
  receive the additional RCPs through a communication channel of the host device; and
  send the additional RCPs to the cryptographic device through the communication port.

15. The system of claim 14, wherein the RCP-enabled application of the host device is further configured to destroy the additional RCPs on the host device after being sent to the cryptographic device by overwriting the additional RCPs multiple times with data patterns different from the additional RCPs.

16. A method, comprising:
  enabling a user to compose an unencrypted message on a user interface of a host device;
  sending the unencrypted message from the host device to a cryptographic device through a communication port, wherein the cryptographic device is attached to the host device;
  encrypting the unencrypted message on the cryptographic device with one or more Random Cipher Pads (RCPs) from an RCP library on a non-volatile storage to create an encrypted transmit message;
  returning the encrypted transmit message from the cryptographic device to the host device through the communication port;
  transmitting the encrypted transmit message from the host device to another device on a communication channel; and
  destroying used RCPs in the RCP library.

17. The method of claim 16, wherein the cryptographic device is a plug-in cryptographic device configured for physically coupling with the host device and sending the unencrypted message further comprises sending the unencrypted message through a plug-in port configured for conveying data between the cryptographic device and the host device.

18. The method of claim 16, further comprising:
  receiving an encrypted receive message through the communication channel on the host device;
  sending the encrypted receive message from the host device to the cryptographic device through the communication port;
  decrypting the encrypted receive message on the cryptographic device with the one or more RCPs from the RCP library to create a decrypted receive message;
  sending the decrypted receive message from the cryptographic device to the host device; and
  presenting the decrypted receive message on a display of the host device.

19. The method of claim 16, further comprising:
  storing at least one stored authentication parameter on the non-volatile storage;
  enabling the user to enter at least one user-entered authentication parameter on the user interface;
  comparing the at least one user-entered authentication parameter to the at least one stored authentication parameter; and
  enabling additional cryptographic features on the host device if the compare matches.

20. The method of claim 16, further comprising destroying the unencrypted message on the host device by overwriting the unencrypted message with the encrypted transmit message, overwriting the unencrypted message multiple times with data patterns different from the unencrypted message, or a combination thereof.

21. The method of claim 16, further comprising:
  receiving additional RCPs through the communication port; and
  storing the additional RCPs in the RCP library.

22. The method of claim 16, further comprising:
  receiving additional RCPs through the communication channel of the host device;
  sending the additional RCPs from the host device to the cryptographic device through the communication port; and
  storing the additional RCPs in the RCP library.

23. The method of claim 22, further comprising destroying the additional RCPs on the host device after being sent to the cryptographic device by overwriting the additional RCPs multiple times with data patterns different from the additional RCPs.

* * * * *